(12) United States Patent
Wang et al.

(10) Patent No.: US 9,897,144 B1
(45) Date of Patent: Feb. 20, 2018

(54) FLEXIBLE BEARING COMPRISING SPACERS

(71) Applicant: HIWIN TECHNOLOGIES CORP, Taichung (TW)

(72) Inventors: Cheng-Lung Wang, Taichung (TW); She-Min Cheng, Taichung (TW); Ping-Hsiu Wu, Taichung (TW)

(73) Assignee: HIWIN TECHNOLOGIES CORP, Taichung (TW)

( * ) Notice: Subject to any disclaimer, the term of this patent is extended or adjusted under 35 U.S.C. 154(b) by 0 days.

(21) Appl. No.: 15/424,884

(22) Filed: Feb. 5, 2017

(51) Int. Cl.
*F16C 27/04* (2006.01)
*F16C 33/37* (2006.01)
*F16C 33/38* (2006.01)
*F16C 33/58* (2006.01)

(52) U.S. Cl.
CPC .......... *F16C 33/3818* (2013.01); *F16C 27/04* (2013.01); *F16C 33/3706* (2013.01); *F16C 33/3887* (2013.01); *F16C 33/585* (2013.01); *F16C 2361/65* (2013.01)

(58) Field of Classification Search
CPC .. F16C 27/04; F16C 33/3706; F16C 33/3712; F16C 33/3812; F16C 33/3818; F16C 33/418; F16C 33/4605; F16C 33/513; F16C 33/541; F16C 33/585; F16C 2361/65
USPC ....... 384/520–521, 523, 531, 533, 623, 572, 384/578, 539, 577
See application file for complete search history.

(56) References Cited

U.S. PATENT DOCUMENTS

| | | | | |
|---|---|---|---|---|
| 985,289 | A * | 2/1911 | Schneider | F16C 33/41 384/534 |
| 2,566,421 | A * | 9/1951 | Lapointe | F16C 19/10 29/898.067 |
| 3,501,212 | A * | 3/1970 | Husten | F16C 19/30 384/614 |
| 3,938,866 | A * | 2/1976 | Martin | F16C 19/30 384/623 |
| 3,966,284 | A * | 6/1976 | Martin | F16C 19/10 384/623 |
| 4,583,793 | A * | 4/1986 | Blatter | F16C 29/0628 384/44 |

(Continued)

FOREIGN PATENT DOCUMENTS

| | | | | |
|---|---|---|---|---|
| GB | 2104600 A | * | 3/1983 | ............. F16C 19/24 |
| WO | WO-2010032577 A1 | * | 3/2010 | .......... F16C 33/3812 |

*Primary Examiner* — Marcus Charles
(74) *Attorney, Agent, or Firm* — Leong C. Lei

(57) ABSTRACT

A flexible bearing including spacers is provided. The flexible bearing includes: an outer race including a rolling groove; an inner race arranged in the outer race and including a rolling trough corresponding the rolling groove to collectively define a loading passage; rolling elements arranged in the loading passage; and spacers each including a retention section for receiving and retaining the rolling elements. Two adjacent ones of the spacers are in contact engagement with each other with end faces thereof and the two end faces are respectively a concave surface and a convex surface. The concave surface and the convex surface of the spacers are allowed to undergo relative sliding so as to allow the spacers to adjust, with respect to each other, an angular position thereof during an operation of the flexible bearing in order to prevent the spacers from interfering with the outer race or the inner race.

3 Claims, 7 Drawing Sheets

(56) References Cited

U.S. PATENT DOCUMENTS

| | | | | |
|---|---|---|---|---|
| 4,586,833 A * | 5/1986 | Walter | ................. | F16C 33/416 |
| | | | | 384/531 |
| 4,715,247 A * | 12/1987 | Honda | ................. | F16C 33/414 |
| | | | | 384/523 |
| 5,082,375 A * | 1/1992 | Hillmann | ................ | F16C 29/04 |
| | | | | 384/526 |
| 6,364,086 B1 * | 4/2002 | Blaurock | ............ | F16C 33/3825 |
| | | | | 193/35 MD |
| 6,619,845 B2 * | 9/2003 | Murata | ................ | F16C 29/065 |
| | | | | 384/44 |
| 7,985,024 B2 * | 7/2011 | Matsumoto | ........... | B29C 33/005 |
| | | | | 29/898.067 |
| 8,794,845 B2 * | 8/2014 | Beck | .................. | F16C 33/4611 |
| | | | | 384/573 |
| 8,882,361 B2 * | 11/2014 | Sekido | ................... | E02F 9/123 |
| | | | | 384/591 |
| 9,004,764 B2 * | 4/2015 | Chen | .................. | F16C 33/6651 |
| | | | | 384/49 |
| 9,097,283 B2 * | 8/2015 | Werner | ............... | F16C 33/4611 |

* cited by examiner

US 9,897,144 B1

FLEXIBLE BEARING COMPRISING SPACERS

(a) TECHNICAL FIELD OF THE INVENTION

The present invention relates to a transmission device, and more particular to a flexible bearing comprising spacers for use with a gear reducer.

(b) DESCRIPTION OF THE PRIOR ART

FIG. 1 shows a conventional flexible bearing that comprises a retainer for use with a strain wave gearing. The flexible bearing allows the strain wave gearing to achieve an effect of speed-reduced output. The flexible bearing comprises an inner race (1), an outer race (2), an annular retainer (3), and a plurality of rolling elements. The retainer (3) is provided with a plurality of receptacles for receiving the rolling elements (4) so as to separate the rolling elements (4) from each other to prevent undesired hit and impact therebetween, which may lead to an increased level of noise during the operation thereof. However, since the flexible bearing, during an operation thereof, may be subjected to deformation and change to an elliptic shape, the outer race (2) of the bearing, during the deformation, may cause interference (X) with the retainer (3), leading to unsmooth operations, and may even cause wear and abrasion of the retainer (3) in worse cases. Thus, it is necessary to further improve the structure of the flexible bearing.

SUMMARY OF THE INVENTION

In view of the above problems, the primary objective of the present invention is to provide a spacer for use with a flexible bearing to help eliminate the above-discussed problems.

To achieve the above objective, the present invention provides a flexible, which comprises: an outer race, which comprises a rolling groove; an inner race, which is arranged in the outer race and comprises a rolling trough corresponding to and opposing the rolling groove such that the rolling groove and the rolling trough collectively define a loading passage; a plurality of rolling elements, which are arranged in the loading passage; and a plurality of spacers, each of which comprises a retention section for receiving and retaining a corresponding one of the rolling elements, such that two adjacent ones of the spacers are in contact engagement with each other with end faces thereof and the two end faces are respectively a concave surface and a convex surface.

Preferably, the convex surface comprises an arc surface that has a radius and the concave surface comprises an arc surface that has a radius, and the radius of the convex surface is greater than the radius of the concave surface.

Preferably, the retention section comprises an opening that has a width that is 0.9-0.95 times of a diameter of each of the rolling elements.

Preferably, the spacers are U-shaped and each of the retention sections is provided with two opposite cavities, the cavities retaining the corresponding rolling element in the retention section.

As such, by means of relative sliding between the concave surface and the convex surface of the spacers, the present invention allows the spacers to adjust, with respect to each other, an angular position thereof during an operation of the flexible bearing in order to prevent the spacers from interfering with the outer race or the inner race.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
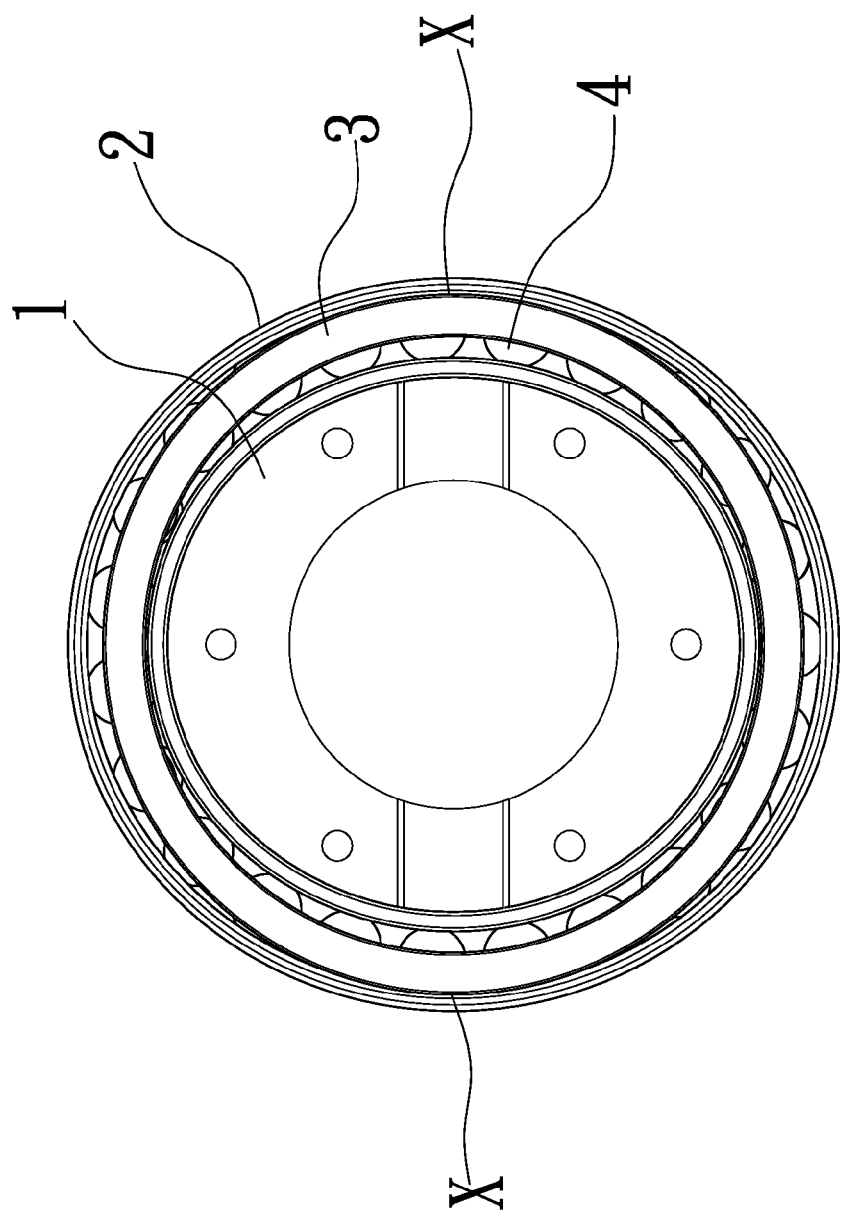
FIG. 1 is an end view of a conventional flexible bearing comprising spacers.
Figure 2:
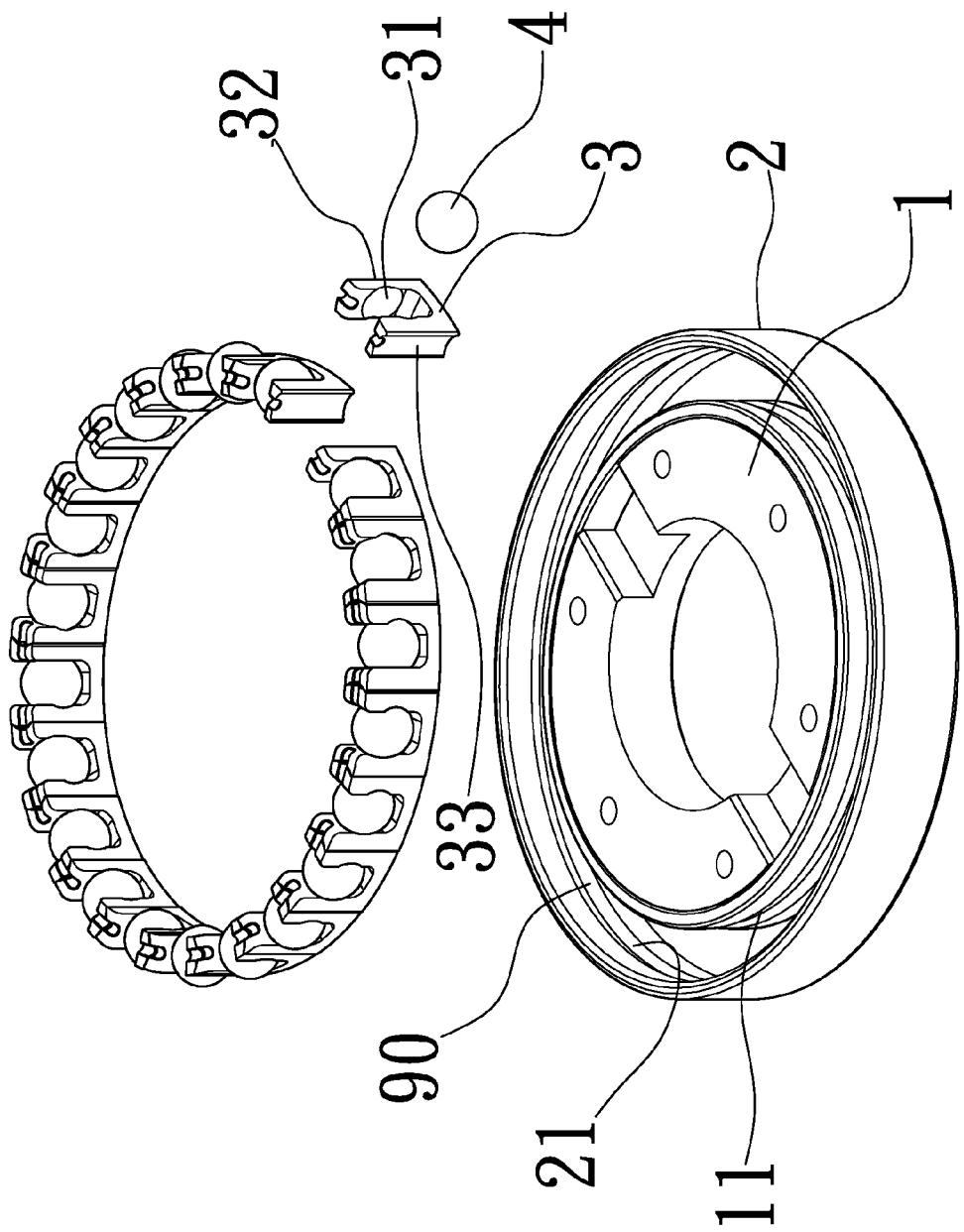
FIG. 2 is an exploded view of a flexible bearing comprising spacers according to the present invention.
Figure 3:
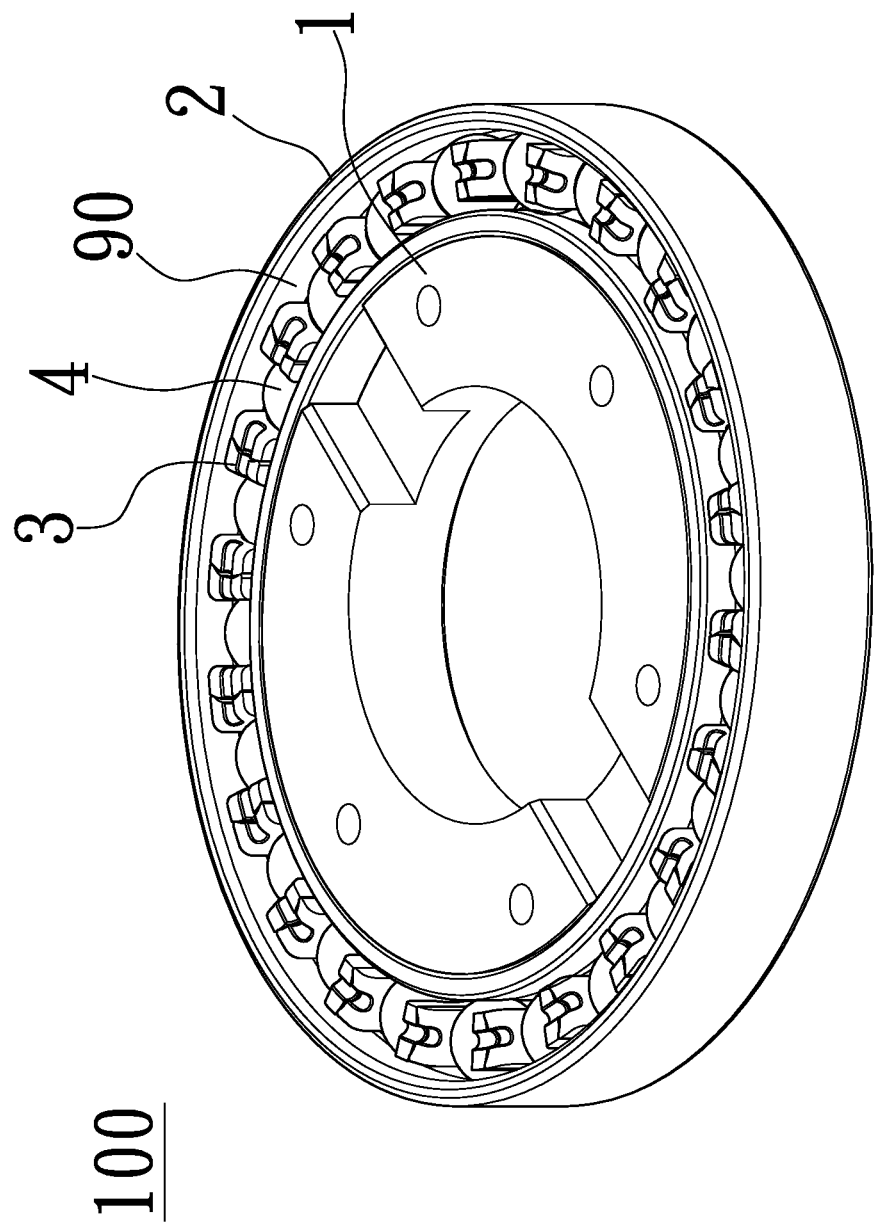
FIG. 3 is a perspective view showing the flexible bearing comprising spacers according to the present invention in an assembled form.
Figure 4:
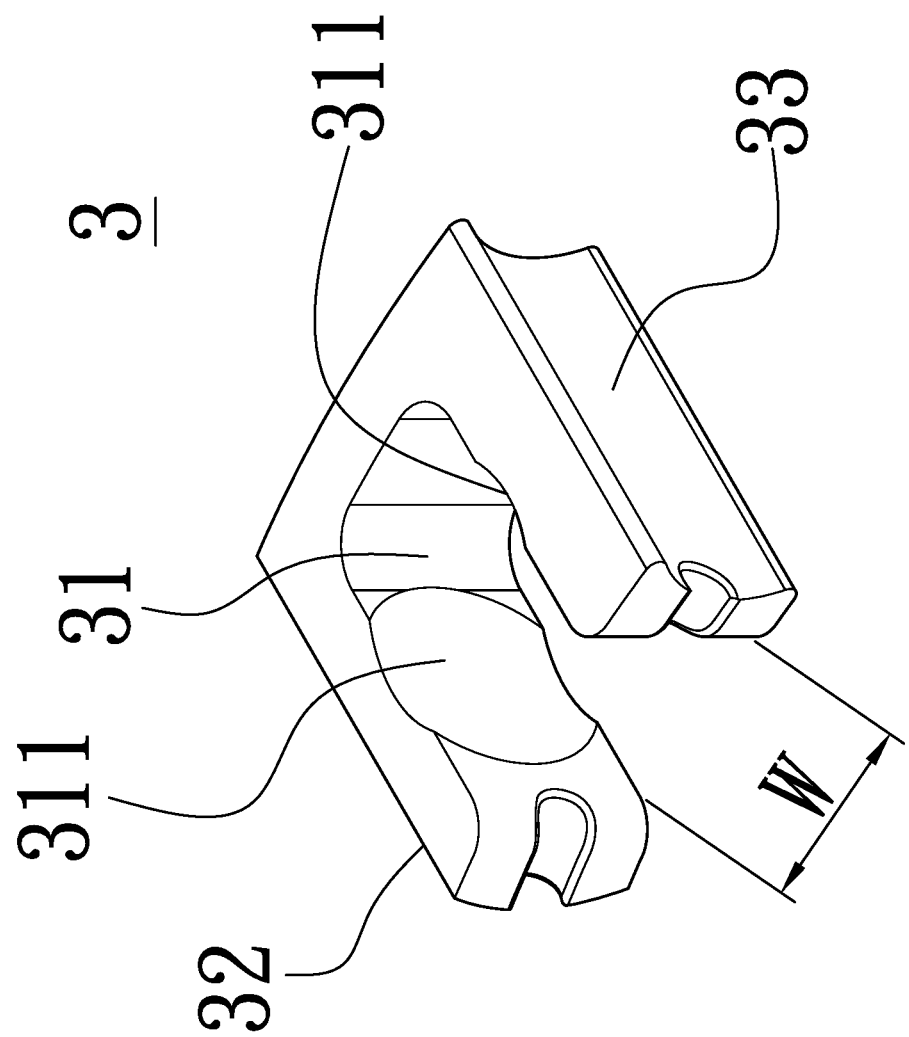
FIG. 4 is a perspective view showing a spacer according to the present invention.
Figure 5:
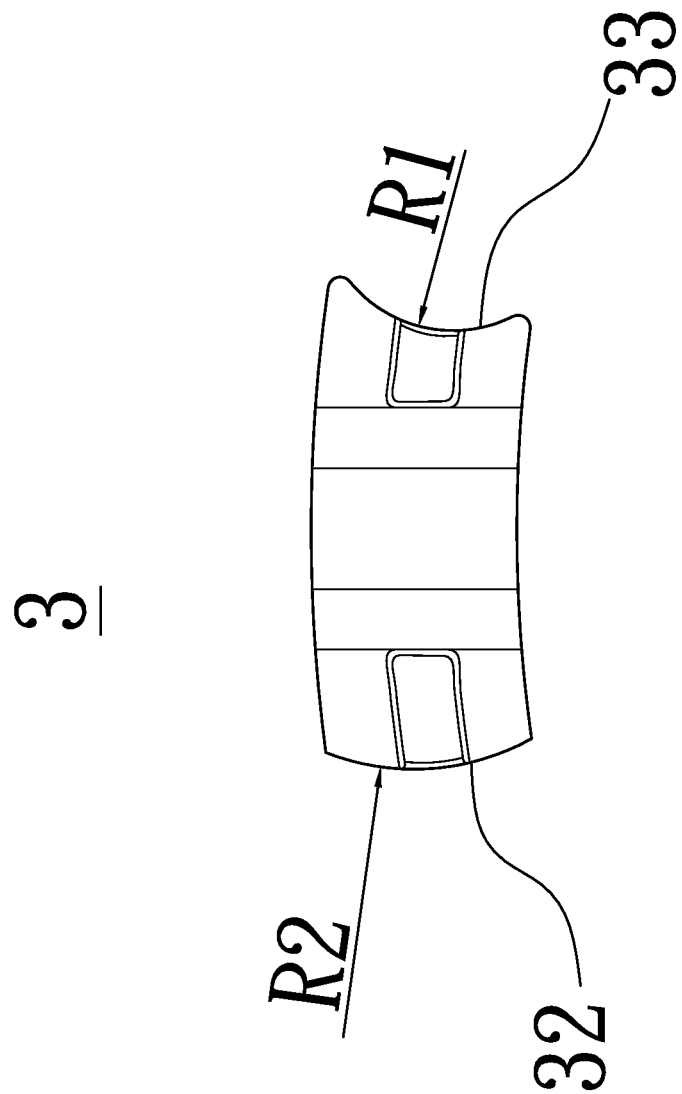
FIG. 5 is a side elevational view showing the spacer according to the present invention.
Figure 6:
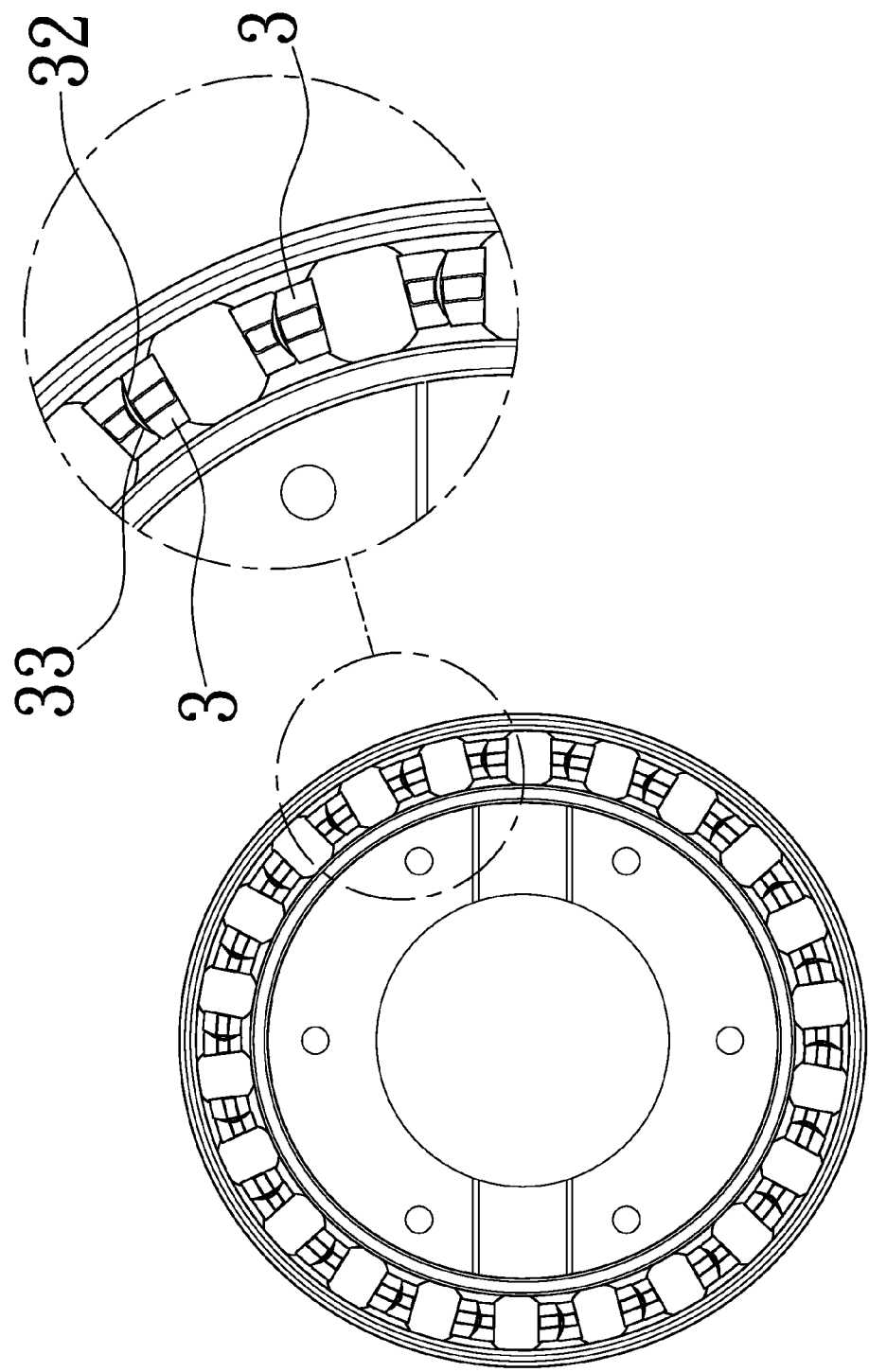
FIG. 6 is an end view of the spacer according to the present invention, together with an enlarged view of a portion thereof.
Figure 7:
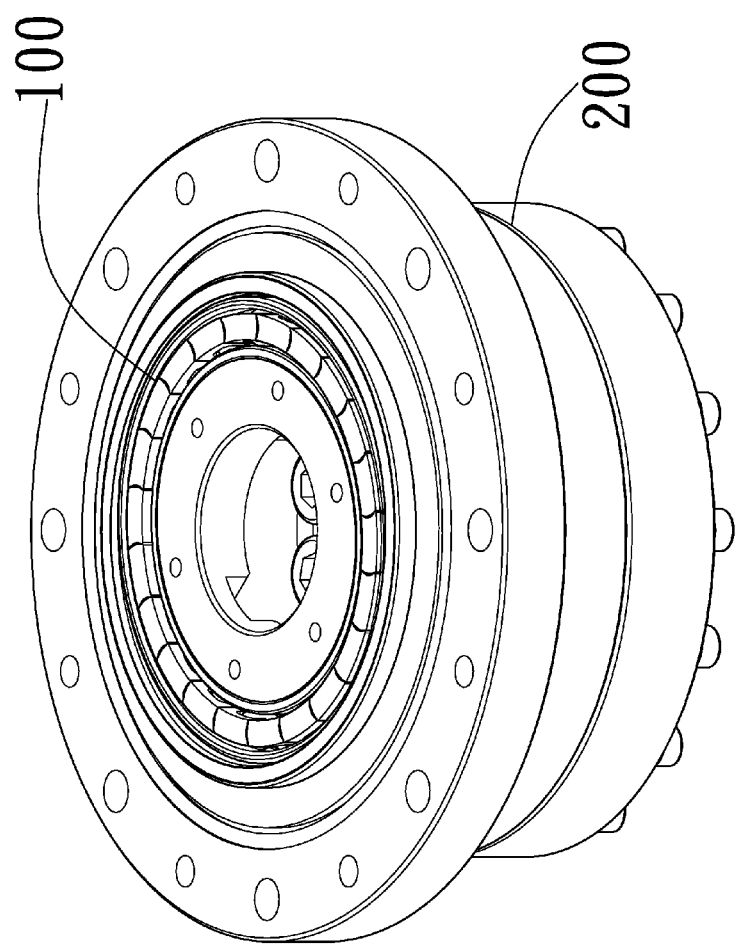
FIG. 7 is a perspective view showing the flexible bearing comprising spacers according to the present invention in combination with a strain wave gearing.

Referring to FIGS. 2-7, the present invention provides a flexible bearing (100), which comprises: an outer race (2), which comprises a rolling groove (21); an inner race (1), which arranged in the outer race (2) and comprises a rolling trough (11) corresponding to and opposing the rolling groove (21), wherein the rolling groove (21) and the rolling trough (11) collectively define a loading passage (90); a plurality of rolling elements (4), which are arranged in the loading passage (90); a plurality of spacers (3), each of which comprises a retention section (31) in which a corresponding one of the rolling elements (4) is accommodated. Two adjacent ones of the spacers (3) are set in contact engagement with each other with end faces thereof and the two end faces that are in contact engagement with each other are respectively a concave surface (33) and a convex surface (32), wherein the convex surface (32) comprises an arc surface that has a radius (R2) and the concave surface (33) comprises an arc surface that has a radius (R1), and the radius (R2) of the convex surface (32) is greater than the radius (R1) of the concave surface (33). The radii (R1, R2) of the concave surface (33) and the convex surface (32) are set such that when the flexible bearing (100) is installed in a strain wave gearing (200), a relative angular position between the two spacers (3) may adjust to prevent the spacers (3) from interfering with the outer race (2) or the inner race (1), as shown in FIGS. 6 and 7. The spacers (3) are U-shaped and each of which comprises two sidewalls defining therebetween the retention section (31) and comprises two opposite cavities (311) respectively formed therein. The cavities (311) help retain the corresponding rolling element (4) in the retention section (31). The retention section (31) has an opening defined between the two sidewalls and the opening has a width (W) that is 0.9-0.95 times of a diameter of each of the rolling elements (4).

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A flexible bearing, comprising: an outer race, which comprises a rolling groove; an inner race, which is arranged in the outer race and comprises a rolling trough corresponding to and opposing the rolling groove such that the rolling groove and the rolling trough collectively define a loading passage; a plurality of rolling elements, which are arranged in the loading passage; and a plurality of spacers, each of which comprises a retention section for receiving and retaining a corresponding one of the rolling elements, such that two adjacent ones of the spacers are in contact engagement with each other with end faces thereof and the two end faces are respectively a concave surface and a convex surface, wherein the spacers are U-shaped and each of the retention sections is provided with two opposite cavities, the cavities retaining the corresponding rolling element in the retention section.

2. The flexible bearing according to claim 1, wherein the convex surface comprises an arc surface that has a radius and the concave surface comprises an arc surface that has a radius, the radius of the convex surface being greater than the radius of the concave surface.

3. The flexible bearing according to claim 1, wherein the retention section comprises an opening that has a width that is 0.9-0.95 times of a diameter of each of the rolling elements.

* * * * *